(12) United States Patent
Kim et al.

(10) Patent No.: US 8,983,539 B1
(45) Date of Patent: Mar. 17, 2015

(54) SMART WATCH, DISPLAY DEVICE AND METHOD OF CONTROLLING THEREFOR

(71) Applicant: LG Electronics Inc., Seoul (KR)

(72) Inventors: Jihwan Kim, Seoul (KR); Jongho Kim, Seoul (KR); Doyoung Lee, Seoul (KR); Eunhyung Cho, Seoul (KR); Sinae Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/194,375

(22) Filed: Feb. 28, 2014

(30) Foreign Application Priority Data

Jan. 23, 2014 (KR) .......... 10-2014-0008382

(51) Int. Cl.
| | |
|---|---|
| *H04B 1/38* | (2006.01) |
| *H04M 3/00* | (2006.01) |
| *H04B 7/00* | (2006.01) |
| *G09G 5/00* | (2006.01) |
| *G06F 13/14* | (2006.01) |

(52) U.S. Cl.
USPC .......... 455/557; 455/41.2; 455/418; 455/566; 345/2.3; 345/520

(58) Field of Classification Search
CPC ......... G06F 1/163; G06F 3/017; G06F 3/014; G06F 2200/1637; H04M 1/0241; H04M 2250/12; H04M 2250/16
USPC ........ 455/41.1–41.3, 88, 90.1–90.3, 455/418–420, 550.1, 456.1–457, 517, 455/556.1, 557, 569.1; 345/1.1–3.4, 5, 520
See application file for complete search history.

(56) References Cited

U.S. PATENT DOCUMENTS

| | | | |
|---|---|---|---|
| 7,532,196 B2 | 5/2009 | Hinckley | |
| 8,379,488 B1* | 2/2013 | Gossweiler et al. | 368/10 |
| 2005/0168399 A1* | 8/2005 | Palmquist | 345/1.1 |
| 2008/0070612 A1* | 3/2008 | Weinans | 455/517 |
| 2010/0112964 A1 | 5/2010 | Yi et al. | |
| 2011/0014956 A1 | 1/2011 | Lee et al. | |
| 2013/0107674 A1 | 5/2013 | Gossweiler, III et al. | |
| 2013/0281164 A1 | 10/2013 | Alameh et al. | |
| 2014/0018094 A1* | 1/2014 | Oren et al. | 455/456.1 |

FOREIGN PATENT DOCUMENTS

EP  2 457 500 A1  5/2012

\* cited by examiner

*Primary Examiner* — Michael Mapa
(74) *Attorney, Agent, or Firm* — Birch, Stewart, Kolasch & Birch, LLP

(57) ABSTRACT

The present specification relates to a smart watch, a display device, and a method of controlling therefor, and more particularly, if a display unit of the smart watch and a display unit of the display device face an identical direction, to a method of providing contents related to each other to each of the display units. The smart watch includes a communication unit to transmit a connection signal and a position state of the smart watch to a display device and receive an execution signal of a first content from the display device, a display unit to display the first content, a sensor unit to detect the position state of the smart watch, a camera unit to sense an image in a front direction, and a processor to control the communication unit, the display unit, the sensor unit, and the camera unit and execute a received control signal.

17 Claims, 13 Drawing Sheets

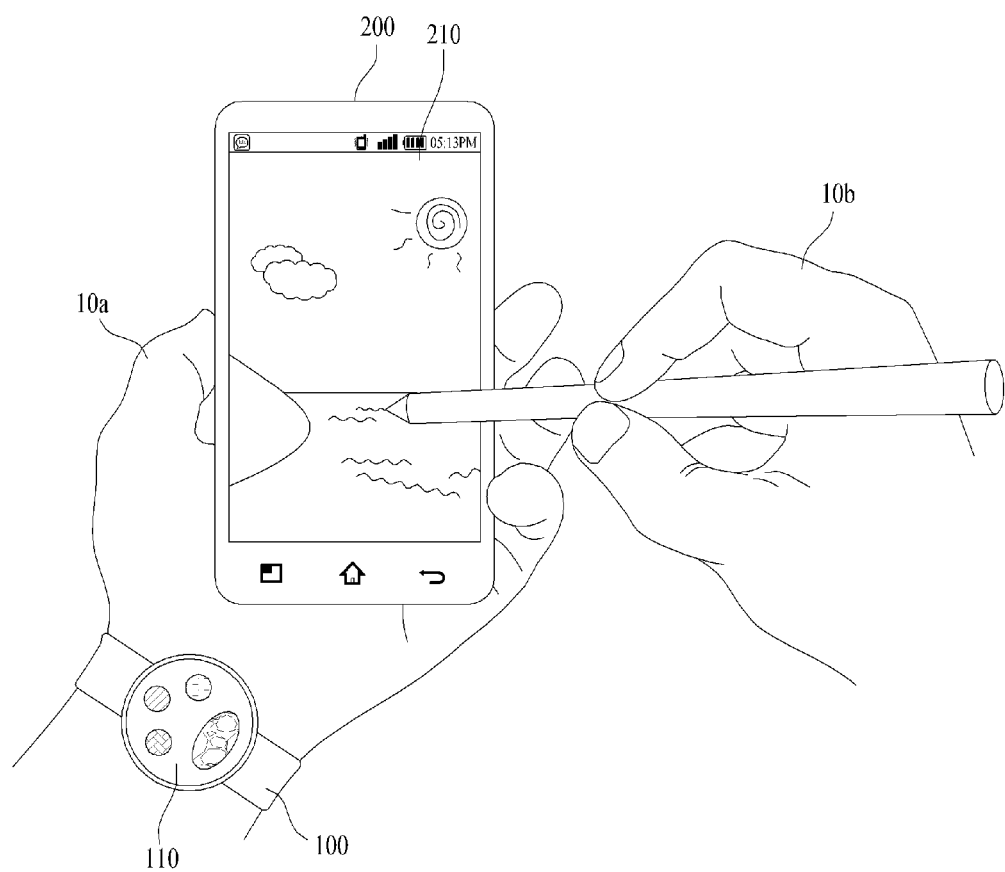

FIG. 5
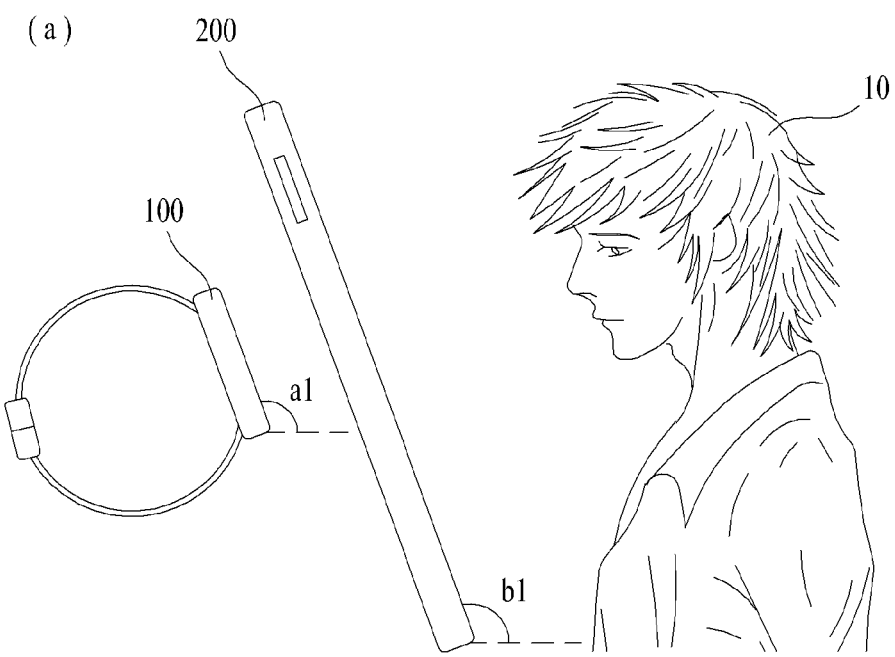
(a)
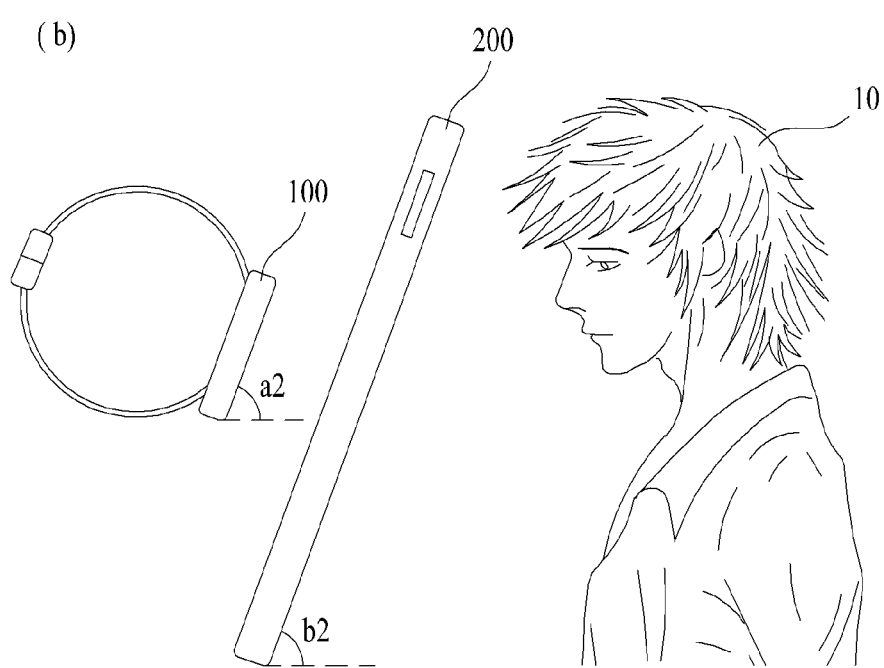
(b)

FIG. 8B
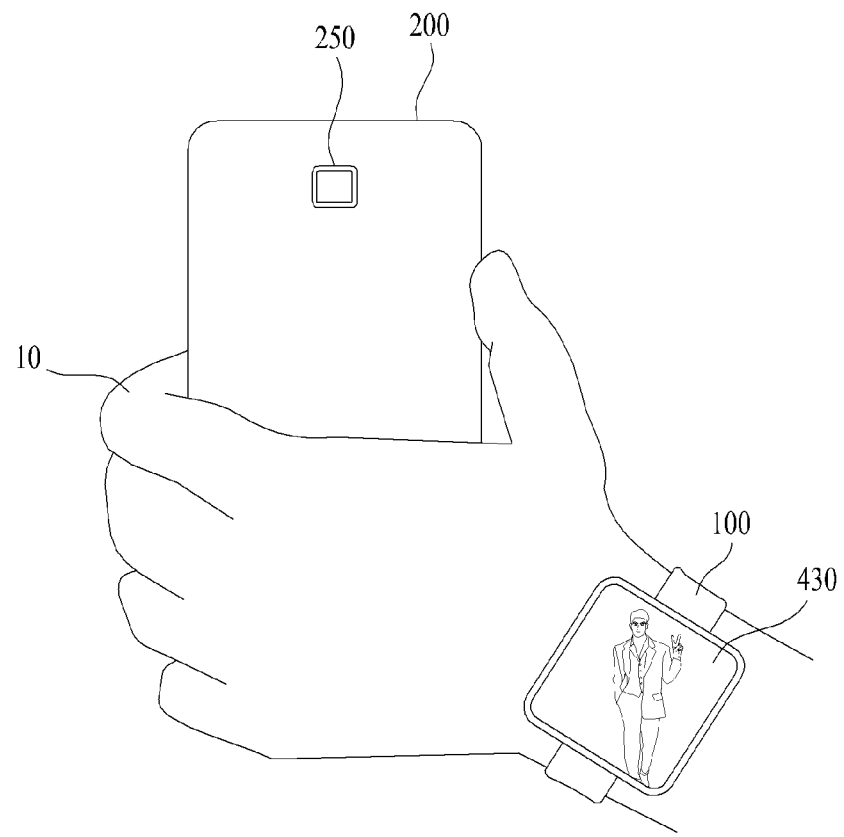
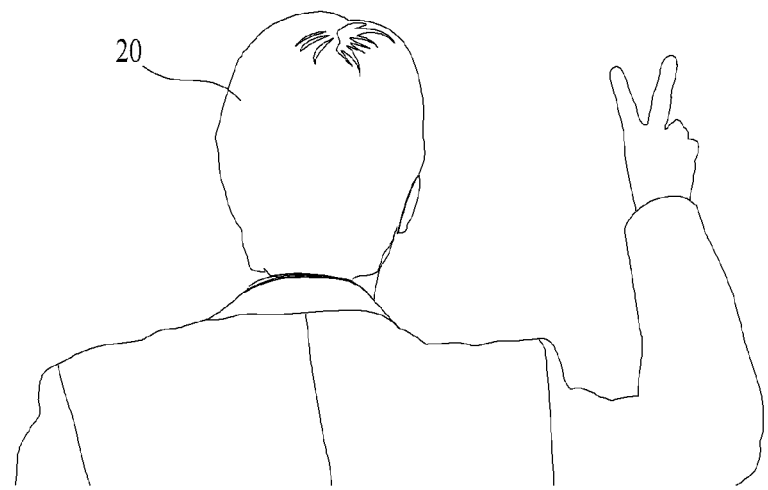

SMART WATCH, DISPLAY DEVICE AND METHOD OF CONTROLLING THEREFOR

Pursuant to 35 U.S.C. §119(a), this application claims the benefit of the Korean Patent Application No. 10-2014-0008382, filed on Jan. 23, 2014, which is hereby incorporated by reference as if fully set forth herein.

BACKGROUND OF THE INVENTION

1. Field of the Invention

The present specification relates to a smart watch, a display device, and a method of controlling therefor, and more particularly, if a display unit of the smart watch and a display unit of the display device face an identical direction, to a method of providing contents related to each other to each of the display units.

2. Discussion of the Related Art

As technologies are developing, development for a wearable computer is accelerated. In this case, the wearable computer indicates a computer capable of being naturally worn on a body like clothes, a watch, glasses, or accessories. Both a smartphone and a tablet PC can be conveniently used by a finger or a touch pen. Yet, there may exist inconvenience of carrying the smartphone or the tablet PC in a pocket, a bag, or by hand. In particular, as a sort of the wearable computer, a wrist watch capable of searching for such various services as a diary, a message, a notification, stock quotes, and the like, i.e., various products related to a smart watch are developing.

Meanwhile, the smart watch can be used in a manner of being synchronized with such a display device as a smartphone. In this case, if contents related to the contents used in the display device are also provided to a display unit of the smart watch, a user can more easily use the contents by using both the display device and the smart watch.

SUMMARY OF THE INVENTION

Accordingly, the present specification is directed to an apparatus and method thereof that substantially obviate one or more problems due to limitations and disadvantages of the related art.

According to one embodiment, if an arrangement state of a smart watch and a display device corresponds to a first state, one object of the present specification is to provide content to a user simultaneously using both a display unit of the smart watch and a display unit of the display device.

If an arrangement state of a smart watch and a display device corresponds to a second state, another object of the present specification is to provide content to a user using a display unit of the smart watch or a display unit of the display device.

If an arrangement state of a smart watch and a display device corresponds to a second state, another object of the present specification is to provide an image sensed by the display device to the smart watch via mirroring.

If an arrangement state of a smart watch and a display device is modified from a first state to a second state, another object of the present specification is to induce the modified arrangement state to return to the first state by providing a third content to the smart watch or the display device.

If an arrangement state of a smart watch and a display device corresponds to a first state, when a gesture input is detected on the smart watch, the other object of the present specification is to extend dimming of a display unit of the display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present specification, as embodied and broadly described, according to one embodiment, a smart watch includes a communication unit configured to transmit a connection signal and a position state of the smart watch to a display device and receive an execution signal of a first content from the display device, a display unit configured to display the first content, a sensor unit configured to detect the position state of the smart watch, a camera unit configured to sense an image in a front direction, and a processor configured to control the communication unit, the display unit, the sensor unit, and the camera unit and execute a received control signal, wherein the display device is configured to receive the connection signal and the position state of the smart watch from the smart watch, execute a second content, detect a position state of the display device, and if an arrangement state of the smart watch and the display device corresponds to a first state, transmit the execution signal of the first content to the smart watch, wherein the first content corresponds to a content relevant to the second content currently executed in the display device, wherein the arrangement state of the smart watch and the display device includes a first state and a second state, wherein the first state corresponds to a state that the display unit of the smart watch and a display unit of the display device face an identical direction, wherein the second state corresponds to a state that the display unit of the smart watch and the display unit of the display device do not face an identical direction.

To further achieve these and other advantages and in accordance with the purpose of the present specification, according to a different embodiment, a display device includes a communication unit configured to receive a connection signal and a position state of a smart watch from the smart watch, and transmit an execution signal of a first content if an arrangement state of the smart watch and the display device corresponds to a first state, a display unit configured to display a second content, a sensor unit configured to detect a position state of the display device, a camera unit configured to sense an image in a front direction, and a processor configured to control the communication unit, the display unit, the sensor unit, and the camera unit, execute the second content, execute a received control signal, wherein the smart watch is configured to transmit the connection signal and the position state of the smart watch to the display device, receive the execution signal of the first content, and execute the first content, wherein the first content corresponds to a content relevant to the second content currently executed in the display device, wherein the arrangement state of the smart watch and the display device includes a first state and a second state, wherein the first state corresponds to a state that a display unit of the smart watch and the display unit of the display device face an identical direction, wherein the second state corresponds to a state that the display unit of the smart watch and the display unit of the display device do not face an identical direction.

According to a further different embodiment, a method of controlling a smart watch includes the steps of detecting a position state of the smart watch, transmitting a connection signal and a position state of the smart watch to a display device, receiving an execution signal of a first content from the display device, and executing a control signal received from the display device, wherein the display device is configured to receive the connection signal and the position state of the smart watch from the smart watch, execute a second content, detect a position state of the display device, and if an arrangement state of the smart watch and the display device corresponds to a first state, transmit the execution signal of the first content to the smart watch, wherein the first content corresponds to a content relevant to the second content currently executed in the display device, wherein the arrangement state of the smart watch and the display device includes a first state and a second state, wherein the first state corresponds to a state that the display unit of the smart watch and a display unit of the display device face an identical direction, wherein the second state corresponds to a state that the display unit of the smart watch and the display unit of the display device do not face an identical direction.

According to a further different embodiment, a method of controlling a display device includes the steps of receiving a connection signal and a position state of a smart watch from the smart watch, executing a second content, executing a second content, and if an arrangement state of the smart watch and the display device corresponds to a first state, transmitting an execution signal of a first content to the smart watch, wherein the smart watch is configured to transmit the connection signal and the position state of the smart watch to the display device, receive the execution signal of the first content, and execute the first content, wherein the first content corresponds to a content relevant to the second content currently executed in the display device, wherein the arrangement state of the smart watch and the display device includes a first state and a second state, wherein the first state corresponds to a state that a display unit of the smart watch and the display unit of the display device face an identical direction, wherein the second state corresponds to a state that the display unit of the smart watch and the display unit of the display device do not face an identical direction.

Accordingly, the present specification provides the following effects or advantages.

According to one embodiment, if an arrangement state of a smart watch and a display device corresponds to a first state, content can be provided to a user simultaneously using both a display unit of the smart watch and a display unit of the display device according to the present specification.

If an arrangement state of a smart watch and a display device corresponds to a second state, content can be provided to a user using a display unit of the smart watch or a display unit of the display device according to the present specification.

If an arrangement state of a smart watch and a display device corresponds to a second state, an image sensed by the display device can be provided to the smart watch via mirroring according to the present specification.

If an arrangement state of a smart watch and a display device is modified from a first state to a second state, the modified arrangement state can be induced to return to the first state by providing a third content to the smart watch or the display device according to the present specification.

If an arrangement state of a smart watch and a display device corresponds to a first state, when a gesture input is detected on the smart watch, dimming of a display unit of the display device can be extended according to the present specification.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1a and FIG. 1b is a diagram for an embodiment of using content via a smart watch and a display device according to the present specification;

FIG. 5 is a diagram for a third embodiment of an arrangement state of a display unit of a smart watch and a display device according to the present specification;

FIG. 8a and FIG. 8b is a diagram for a third embodiment of a method of controlling a smart watch and a display device according to the present specification;

DETAILED DESCRIPTION OF THE INVENTION

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Moreover, while the embodiments have been concretely described with reference to the attached diagrams and the contents written on the diagrams, the present specification may be non-restricted or non-limited to the embodiments.

Figure 1B:
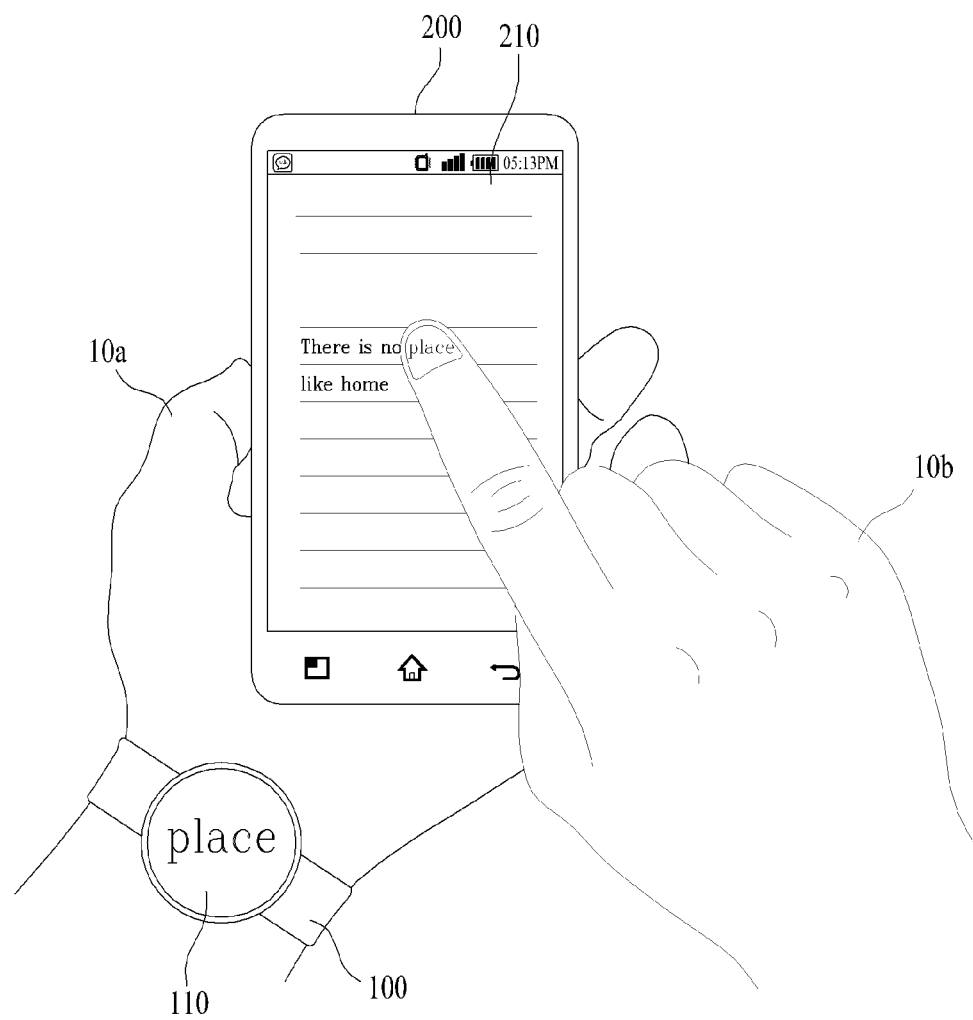

FIG. 1 is a diagram for an embodiment of using content via a smart watch and a display device according to the present specification. More specifically, FIG. 1a is a diagram for a case of using a drawing content via a smart watch 100 and a display device 200 and FIG. 1b is a diagram for a case of using document content via the smart watch 100 and the display device 200.

First of all, the smart watch 100 and the display device 200 can provide contents, which are related to each other under a prescribed condition, to a user in a state of being paired with each other. For instance, referring to FIG. 1a, the smart watch 100 and the display device 200 can execute a drawing content in a state that the smart watch 100 and the display device 200 are paired with each other. In this case, since a display unit 210 of the display device 200 is greater than a display unit 110 of the smart watch 100 in size, the display unit 210 of the display device 200 is used as a main display and the display unit 110 of the smart watch 100 can be used as a sub display. As depicted in FIG. 1a, a user 10 may use the display unit 210 of the display device 200 as a sketch book and use the display unit 110 of the smart watch 100 as a palette. In particular, while wearing the smart watch 100 on a left wrist and holding the display device 200 by a left hand 10a, the user 10 can use both devices at the same time using a stylus pen by a right hand 10b.

And, for instance, referring to FIG. 1 b, the smart watch 100 and the display device 200 can execute document content in a state that the smart watch 100 and the display device 200 are paired with each other. In this case, as mentioned earlier in FIG. 1a, the display unit 210 of the display device 200 is used as a main display and the display unit 110 of the smart watch 100 can be used as a sub display. As depicted in FIG. 1b, a user 10 draws up a document in the display unit 210 of the display device 200 and can control a font, space, and the like of the drawn up document in the display unit 110 of the smart watch 100. In particular, while wearing the smart watch 100 on a left wrist and holding the display device 200 by a left hand 10a, the user 10 can enlarge or edit 'place' in the smart watch 100 in a manner of touching 'place' by a right hand 10b in a sentence 'There is no place like home' displayed in the display unit 210.

In particular, as mentioned earlier in the embodiment of FIG. 1, a method for a user to use contents related to each other in a manner of simultaneously activating both the smart watch 100 and the display device 200 is explained in the present specification.

Figure 2:
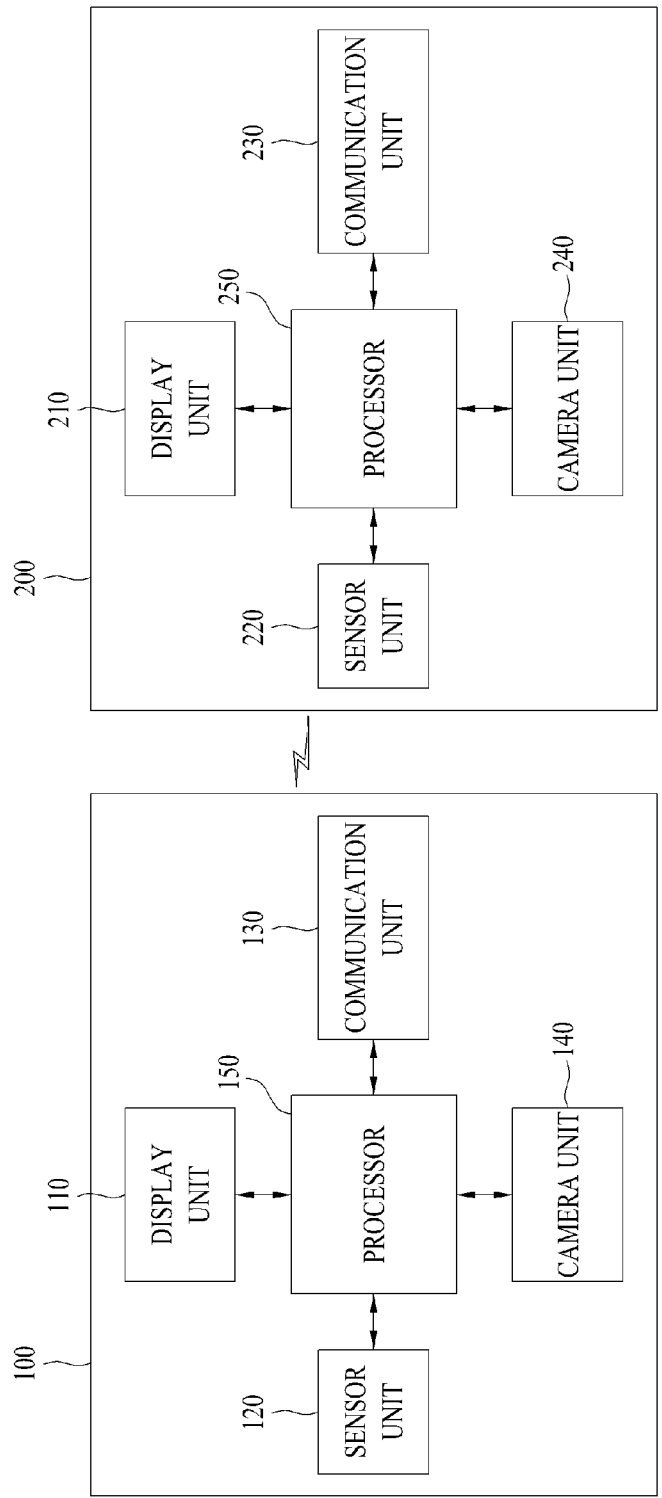
FIG. 2 is a diagram for a block diagram of a smart watch and a display device according to the present specification.

FIG. 2 is a diagram for a block diagram of a smart watch and a display device according to the present specification. Yet, FIG. 2 is just an embodiment. A part of configuration modules can be deleted or a new configuration module can be added according to the necessity of those skilled in the art.

As depicted in FIG. 2, the smart watch 100 according to one embodiment includes a display unit 110, a sensor unit 120, a communication unit 130, a camera unit 140, and a processor 150. The display device 200 may include a display unit 210, a sensor unit 220, a communication unit 230, a camera unit 240, and a processor 250.

First of all, the smart watch 100 is a sort of wearable computer and may indicate an embedded system wrist watch capable of driving a mobile application. And, the display device 200 may include a digital device of various forms capable of displaying an image such as a PC, a PDA (personal digital assistant), a notebook, a tablet PC, a smartphone, and the like. In particular, the display device 200 may include various devices equipped with a touch screen. In the present specification, assume that the display device 200 works as a main device and the smart watch 100 works as a sub device.

The display unit 110/210 can display visual information. In this case, the visual information may include content, an application, an image, a video, and the like. And, the display unit 110/210 can output the visual information based on a control command of the processor 150/250.

According to the present specification, the display unit 110 of the smart watch 100 can display a first content. And, according to the present specification, the display unit 210 of the display device 200 can display a second content. The first content is content related to the second content. Regarding the first and the second content, it shall be described later with reference to FIG. 6. Meanwhile, according to the present specification, the display unit 110 of the smart watch 100 and the display unit 210 of the display device 200 may correspond to a touch screen.

The sensor unit 120/220 senses a neighboring environment of the smart watch 100 or the display device 200 using at least one sensor installed in the smart watch 100 or the display device 200 and can deliver a sensed result to the processor 140/240 as a signal form.

The sensor unit 120/220 may include at least one sensing means. As one embodiment, the at least one sensing means mat include such a sensing means as a gravity sensor, a terrestrial magnetism sensor, a motion sensor, a gyroscope sensor, an acceleration sensor, an infrared sensor, a tilt (inclination) sensor, a brightness sensor, an altitude sensor, a smell sensor, a temperature sensor, a depth sensor, a pressure sensor, a bending sensor, an audio sensor, a video sensor, a GPS (global positioning system) sensor, a touch sensor, a grip sensor, and the like.

And, the sensor unit 120/220 is a common name for the aforementioned various sensing means. The sensing unit senses various inputs of a user and environment of the smart watch 100 or the display device 200 and can deliver a sensed result to the processor 150/250 in order for the processor to perform an operation in accordance with the sensed result.

According to the present specification, the sensor unit 120 of the smart watch 100 can detect a position state of the smart watch 100. For instance, the smart watch 100 can detect a tilt, a direction, an angle, and the like of the display unit of the smart watch 100 using the terrestrial magnetism sensor, the acceleration sensor, the gravity sensor, and the like included in the sensor unit 120. And, the sensor unit 120 of the smart watch 100 can detect a second gesture input performed on the display unit 110. For instance, a tilt, a direction, an angle, and the like of the display unit of the display device 200 can be detected by the terrestrial magnetism sensor, the acceleration sensor, the gravity sensor, and the like included in the sensor unit 220 of the display device 200.

And, according to the present specification, the sensor unit 220 of the display device 200 can detect a position state of the display device 200. And, the sensor unit 220 of the display device 200 can detect a first gesture input performed on the display unit 210. And, the sensor unit 120 of the smart watch 100 can detect a second gesture input performed on the display unit 110. For instance, the first and the second gesture input may include a short touch, a long touch, a near touch, a drag touch, and the like. Regarding this, it shall be described again with reference FIG. 3 to FIG. 7.

The communication unit 130/230 performs a communication with an external device using various protocols and can transceive data with the external device. And, the communication unit 130/230 can transmit and receive such a digital data as content and the like by accessing a network in wireless or wired. For instance, the communication unit 130/230 may use such a communication standard as WLAN (Wireless LAN) (Wi-Fi), Wibro (Wireless broadband), Wimax (World Interoperability for Microwave Access), HSDPA (High Speed Downlink Packet Access) to access a wireless network.

According to the present specification, the communication unit 130 of the smart watch 100 transmits a connection signal and a position state of the smart watch 100 to the display device 200 and can receive an execution signal of a first content from the display device 200. And, according to the present specification, the communication unit 230 of the display device 200 receives the connection signal and the position state of the smart watch 100 from the smart watch 100, if an arrangement state of the smart watch 100 and the display device 200 correspond to a first state, the communication unit 230 of the display device 200 can transmit the execution signal of the first content to the smart watch 100.

The camera unit 140/240 senses an image within an angle of view area of a front direction and can deliver the image to the processor 150/250. In this case, the angle of view area indicates a range of a horizontal and vertical viewing angle capable of being included in a prescribed screen in case of sensing an image. According to the present specification, the camera unit 140 of the smart watch 100 can sense an image within an angle of view area. And, the camera unit 240 of the display device 200 can sense an image within an angle of view area. The display device 200 can determine an arrangement state of the smart watch 100 and the display device 200 based on a similarity of images sensed by the camera units 140/240. Regarding this, it shall be described again with reference to FIG. 6.

The processor 150/250 processes data, controls each unit of the aforementioned smart watch 100 or the display device 200, and can control data transmission and reception between the units. According to the present specification, the processor 150 of the smart watch 100 can execute a first content. And, according to the present specification, the processor 250 of the display device 200 can execute a second content as one embodiment of the present specification, operations performed by the smart watch 100 or the display device 200 can be controlled by the processor 150/250. For clarity, the operations are commonly explained as performed/controlled by the smart watch 100 or the display device 200 in the following drawings and description.

Meanwhile, although it is not depicted in FIG. 2, the smart watch 100 or the display device 200 can include a power unit, a storage unit, an audio unit, and the like.

The power unit is a power source connected to an internal battery or an external power supply of the smart watch 100 or the display device 200. The power unit can supply power to the smart watch 100 or the display device 200. And, the storage unit can store such various digital data as an audio, a picture, a video, an application, and the like. The storage unit may indicate such various digital data storage spaces as a flash memory, RAM (random access memory), SSD (solid state drive), and the like. The audio unit can receive/output an audio data via a microphone and a speaker.

The smart watch 100 or the display device 200 depicted in FIG. 2 is a block diagram according to one embodiment. Blocks represented in a manner of being separated indicate the logically distinguished elements of the smart watch 100 or the display device 200. Hence, the elements of the aforementioned smart watch 100 or the display device 200 can be equipped with a single chip or a plurality of chips according to the design of the device.

In the following description, FIG. 3 to FIG. 5 indicates an arrangement state of the smart watch 100 and the display device 200. In this case, the arrangement state of the smart watch 100 and the display device 200 can be determined based on a position state of the smart watch 100 and a position state of the display device 200. And, the aforementioned position state may include an angle of the display unit of each device, an image sensed by a camera, and the like.

And, the arrangement state of the display unit 110 of the smart watch 100 and the display unit 210 of the display device 200 may include a first and a second state. In this case, the first state may indicate a state that a user 10 can use contents related to each other via the display unit 110 of the smart watch 100 and the display unit 210 of the display device 200. And, the second state may indicate that the user 10 is unable to use the contents related to each other via the display unit 110 of the smart watch 100 and the display unit 210 of the display device 200.

Figure 3:
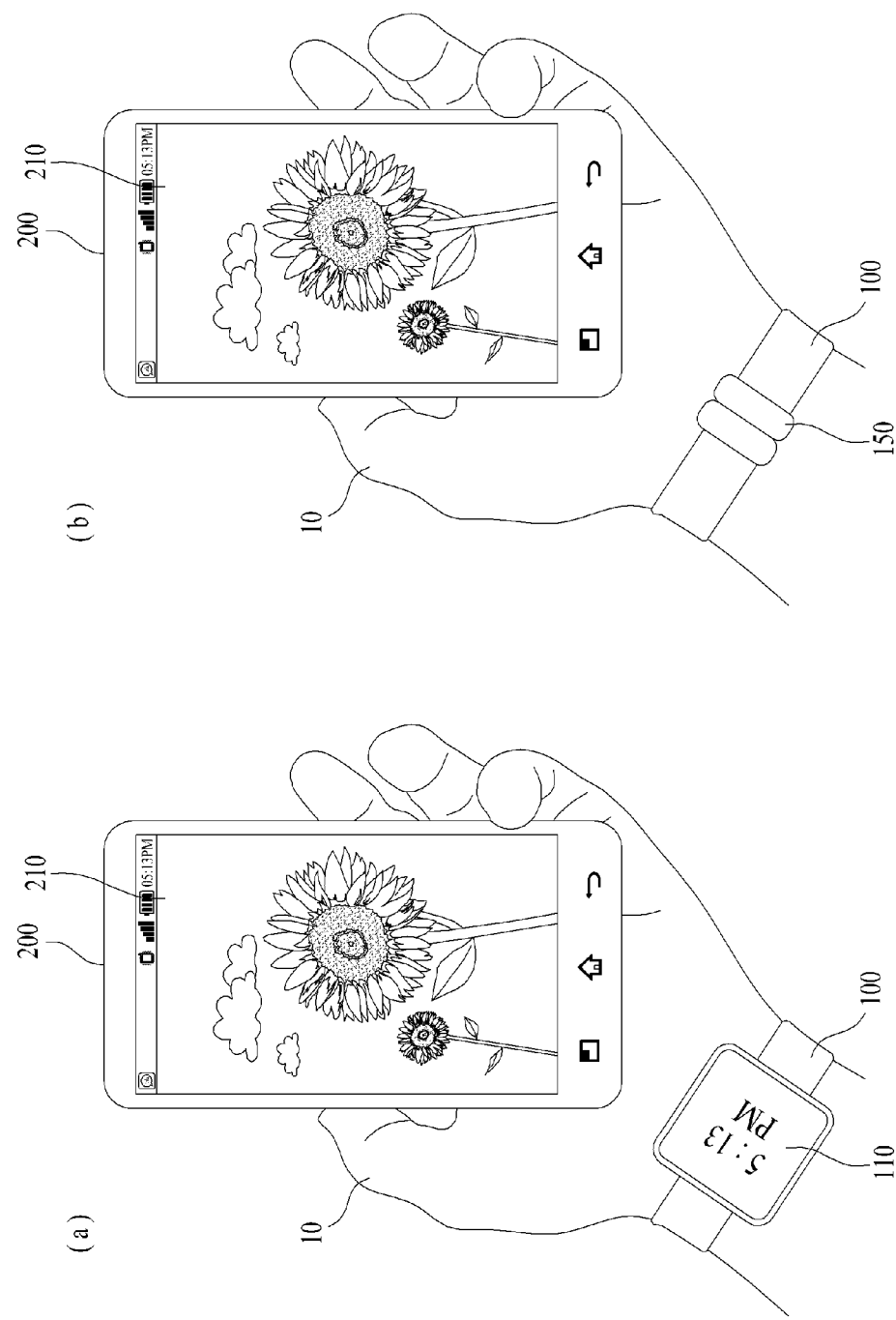
FIG. 3 is a diagram for a first embodiment of an arrangement state of a display unit of a smart watch and a display device according to the present specification.

FIG. 3 is a diagram for a first embodiment of an arrangement state of a display unit of a smart watch and a display device according to the present specification. More specifically, FIG. 3 indicates the arrangement state of the smart watch 100 and the display device 200 based on a direction at which the display unit 110 of the smart watch 100 and the display unit 210 of the display device 200 face.

According to embodiment of FIG. 3, the arrangement state of the smart watch 100 and the display device 200 can be determined based on whether the display unit 110 of the smart watch 100 and the display unit 210 of the display device 200 face an identical direction.

First of all, a first state indicates a state that the display unit 110 of the smart watch 100 and the display unit 210 of the display device 200 face an identical direction. For instance, referring to FIG. 3 (a), the first state corresponds to a state that both the display unit 110 of the smart watch 100 and the display unit 210 of the display device 200 face a user 10. In the present specification, although a hand of the user 10 is depicted only in each of the drawings, it indicates a state that the user 10 is wearing the smart watch 100 on a left wrist while holding the display device 200 by a left hand. Hence, assume that the user 10 is in a state of looking at the smart watch 100 and the display device 200.

In the state of FIG. 3 (a), both the display unit 110 of the smart watch 100 and the display unit 210 of the display device 200 are available to the user 10. Yet, unlike the case depicted in FIG. 3 (a), a case that both the display unit 110 of the smart watch 100 and the display unit 210 of the display device 200 face an opposite side of the user 10, it may correspond to the first state as well.

Subsequently, a second state indicates a state that the display unit 110 of the smart watch 100 and the display unit 210 of the display device 200 do not face an identical direction. For instance, referring to FIG. 3 (b), the second state corresponds to a state that the display unit 110 of the smart watch 100 faces an opposite side of the user 10, a buckle part faces the user 10, and the display unit 210 of the display device 200 faces the user 10. In particular, in the state of FIG. 3 (b), the user 10 cannot use the display unit 110 of the smart watch 100 and the display unit 210 of the display device 200 at the same time. And, unlike the state depicted FIG. 3 (b), a case that the display unit 110 of the smart watch 100 faces the user 10 and the display unit 210 of the display device 200 faces an opposite side of the user 10 may correspond to the second state as well.

Meanwhile, whether the display unit 110 of the smart watch 100 and the display unit 210 of the display unit 200 face an identical direction can be determined by the sensor unit, the camera unit, and the like installed in the smart watch 100 or the display device 200.

In one embodiment, the camera unit installed in the smart watch 100 and the camera unit installed in the display device 200 can determine whether the smart watch 100 and the display device 200 face an identical direction via a similarity of images sensed by each of the camera units. In this case, the display device 200 receives an image sensed by the camera unit of the smart watch 100 from the smart watch 100 and compares the image with an image sensed by the camera unit of the display device 200. And, if a similarity between the image sensed by the smart watch and the image sensed by the display device exceeds a predetermined ratio, it may be determined as the first state. And, the display device 200 receives an image sensed by the camera unit of the smart watch 100 from the smart watch 100 and compares the image with an image sensed by the camera unit of the display device 200. And, if a similarity between the image sensed by the smart watch and the image sensed by the display device does not exceed a predetermined ratio, the display device can determine it as the second state.

In this case, assume that the camera unit of the smart watch 100 and the camera unit of the display device 200 are positioned at an identical side. For instance, it may assume that the camera unit is positioned at the front of the display unit 110 of the smart watch 100 and the camera unit is positioned at the front of the display unit 210 of the display device 200.

In another embodiment, whether the smart watch 100 and the display device 200 face an identical direction can be determined by detecting a direction of each device via a terrestrial magnetism sensor and a gravity sensor installed in the smart watch 100 and a terrestrial magnetism sensor and a gravity sensor installed in the display device 200. In this case, the display device 200 receives a position state of the smart watch 100 from the smart watch 100 and can determine whether the display device 200 and the smart watch 100 are in the first state. In particular, if the display unit 110 of the smart watch 100 and the display unit 210 of the display device 200 are positioned in an identical direction within a predetermined range, the display device 200 can determine it as the first state.

Also, in another embodiment, the display device 200 can determine whether the smart watch 100 and the display device 200 face an identical direction by detecting an angle of each device via a gyro sensor installed in the smart watch 100 and a gyro sensor installed in the display device 200. In this case, the display device 200 receives a position state of the smart watch 100 from the smart watch 100 and can determine whether the display device 200 and the smart watch 100 are in the first state. In particular, if the display unit 110 of the smart watch 100 and the display unit 210 of the display device 200 are positioned within an angle of a predetermined range, the display device 200 can determine it as the first state. Also, if the display unit 110 of the smart watch 100 and display unit 210 of the display device 200 are positioned outside of the angle of the predetermined range, the display device 200 can determine it as the second state.

Also, in another embodiment, the display device 200 can determine whether the smart watch 100 and the display device 200 face an identical direction by detecting a touch area of each device via a touch sensor installed in the smart watch 100 and a touch sensor and a grip sensor installed in the display device 200. For instance, if a rear side of the smart watch 100 detects an inside of a wrist, a sensor unit installed in the display device 200 detects a grip of a side of the display device 200, and a rear side of the display device detects a palm, the display device 200 can determine it as the first state. And, for instance, if the rear side of the smart watch 100 detects an outside of the wrist, the display device 200 can determine it as the second state.

Figure 4:
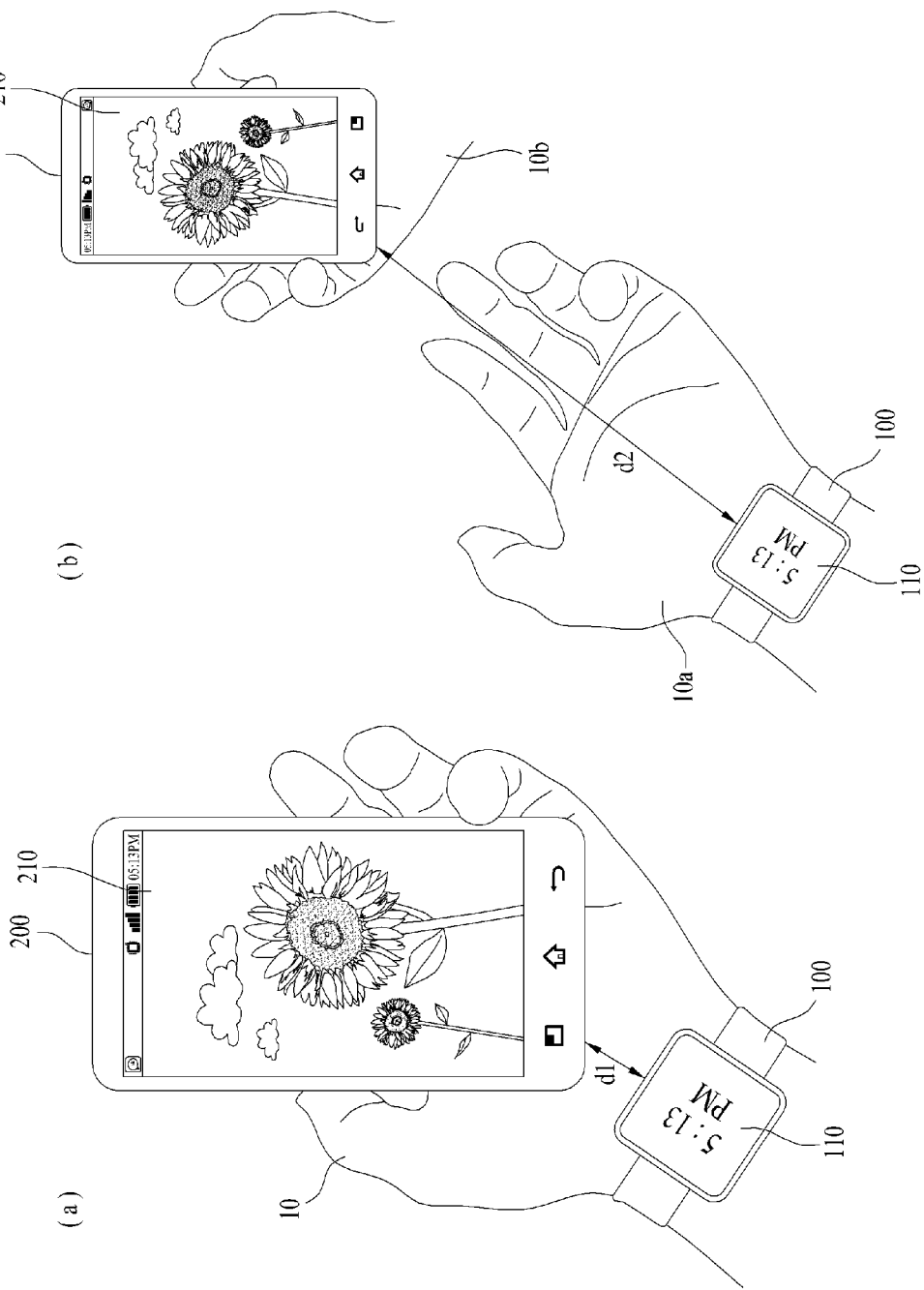
FIG. 4 is a diagram for a second embodiment of an arrangement state of a display unit of a smart watch and a display device according to the present specification.

FIG. 4 is a diagram for a second embodiment of an arrangement state of a display unit of a smart watch and a display device according to the present specification. More specifically, FIG. 4 indicates the arrangement state of the smart watch 100 and the display device 200 based on a distance between the smart watch 100 and the display device 200.

According to embodiment of FIG. 4, the arrangement state of the smart watch 100 and the display device 200 can be determined based on whether the smart watch 100 and the display device 200 are positioned within a predetermined distance range (d).

First of all, a first state indicates that the smart watch 100 and the display device 200 are positioned within a predetermined distance range. For instance, referring to FIG. 4 (a), the smart watch 100 is positioned at a d1 distance from the display device 200. In this case, the d1 distance may correspond to a distance within the predetermined distance range (d). In this case, while wearing the smart watch 100 on a left wrist and holding the display device 200 by a left hand, a user 10 can use the display unit 110 of the smart watch 100 and content displayed in the display unit 210 of the display device by a right hand.

Subsequently, a second state indicates that the smart watch 100 and the display device 200 are positioned outside of a predetermined distance range. For instance, referring to FIG. 4 (b), the smart watch 100 is positioned at a d2 distance from the display device 200. In this case, the d2 distance may correspond to a distance outside of the predetermined distance range (d). In particular, in the state of FIG. 4 (b), while wearing the smart watch 100 on a left wrist 10a and holding the display device 200 by a right hand, a user 10 may be difficult to use the display unit 110 of the smart watch 100 and content displayed in the display unit 210 of the display device at the same time.

FIG. 5 is a diagram for a third embodiment of an arrangement state of a display unit of a smart watch and a display device according to the present specification. More specifically, FIG. 5 indicates the arrangement state of the smart watch 100 and the display device 200 based on an angle range of the display unit 110 of the smart watch 100 and the display unit 210 of the display device 200.

According to embodiment of FIG. 5, the arrangement state of the smart watch 100 and the display device 200 can be determined based on whether the display unit 110 of smart watch 100 and the display unit 210 of the display device 200 are positioned within a predetermined angle range.

First of all, a first state indicates a state that the display unit 110 of the smart watch 100 and the display unit 210 of the display device 200 face a user 10. In this case, the state of facing the user 10 indicates a state for the user easily to watch and use content displayed in the smart watch 100 and the display device 200. More specifically, the first state indicates that the display unit 110 of the smart watch is positioned in a first angle range and the display unit 210 of the display device 200 is positioned in a second angle range.

In this case, the first angle range corresponds to an angle capable of using the display unit 110 of the smart watch 100 by the user 10 and the second angle range corresponds to an angle capable of using the display unit 210 of the display device 200 by the user 10. In particular, the first angle range of the smart watch 100 corresponds to an angle capable of using the display unit 110 by the user 10 without any inconvenience. For instance, the first angle range may correspond to an angle ranging from 90 degrees to 180 degrees. And, the second angle range of the display device 200 corresponds to an angle capable of using the display unit 210 by the user 10 without any inconvenience. For instance, the second angle range may correspond to an angle ranging from 0 degree to 90 degrees.

In the state of FIG. 5 (a), the display unit 110 of the smart watch 100 is positioned in an a1 angle and the display unit 210 of the display unit 200 is positioned in a b1 angle. In this case, assume that the a1 angle corresponds to the first angle range (a) of the display unit 110 of the smart watch 100 and the b1 angle corresponds to the second angle range (b) of the display unit 210 of the display device 200. In particular, in the state of FIG. 5 (a), the user 10 can easily use the display unit 110 of the smart watch 100 and the display unit 210 of the display device 200.

Subsequently, a second state indicates a state that at least one of the display unit 110 of the smart watch 100 and the display unit 210 of the display device 200 does not face a user 10. In this case, the state of not facing the user 10 may indicate not only a case that the display unit 110/210 faces an opposite side of the user 10 but also a case that the user 10 is not convenient to watch and use the display unit 110/210. More specifically, the second state indicates a state that the display unit 110 of the smart watch 100 is not positioned in the first angle range or a state that the display unit 210 of the display device 200 is not positioned in the second angle range.

For instance, as depicted in FIG. 5 (b), if the display unit 110 of the smart watch 100 is positioned in an a2 angle and the display unit 210 of the display device 200 is positioned in a b2 angle, it may correspond to the second state. In this case, assume that the a2 angle does not correspond to the first angle range of the display unit 110 of the smart watch 100 and the b2 angle does not correspond to the second angle range of the display unit 210 of the display device 200. In particular, in the state of FIG. 5 (b), it is difficult for the user 10 to easily use the display unit 110 of the smart watch 100 and the display unit 210 of the display device 200. And, for instance, although it is not depicted in FIG. 5 (b), if the display unit 110 of the smart watch 100 is positioned in the a1 angle and the display unit 210 of the display device 200 is positioned in the b2 angle, it may correspond to the second state as well.

The first and the second state of the display unit 110 of the smart watch 100 and the display unit 210 of the display device 200 have been defined via the embodiments of the aforementioned FIG. 3 to FIG. 5. Although it is not mentioned earlier in FIG. 3 to FIG. 5, the first and the second state can be defined by various criteria. In particular, the first and the second state can be defined in a manner of applying a plurality of criteria mentioned earlier in FIG. 3 to FIG. 5. For instance, the first state may correspond to a state that the display unit 110 of the smart watch 100 and the display unit 210 of the display device 200 face an identical direction and the smart watch 100 and the display device 200 are positioned within a predetermined distance range.

In the following description, FIG. 6 to FIG. 9 explains a method for a user to use content based on an arrangement state of the display unit of the smart watch and the display unit of the display device. And, in embodiment of FIG. 6 to FIG. 9, assume that the smart watch and the display device are in a state of being paired with each other. For instance, the smart watch 100 or the display device 200 can induce the smart watch 100 and the display device 200 to be in the state of being paired with each other by transmitting a connection signal.

Figure 6:
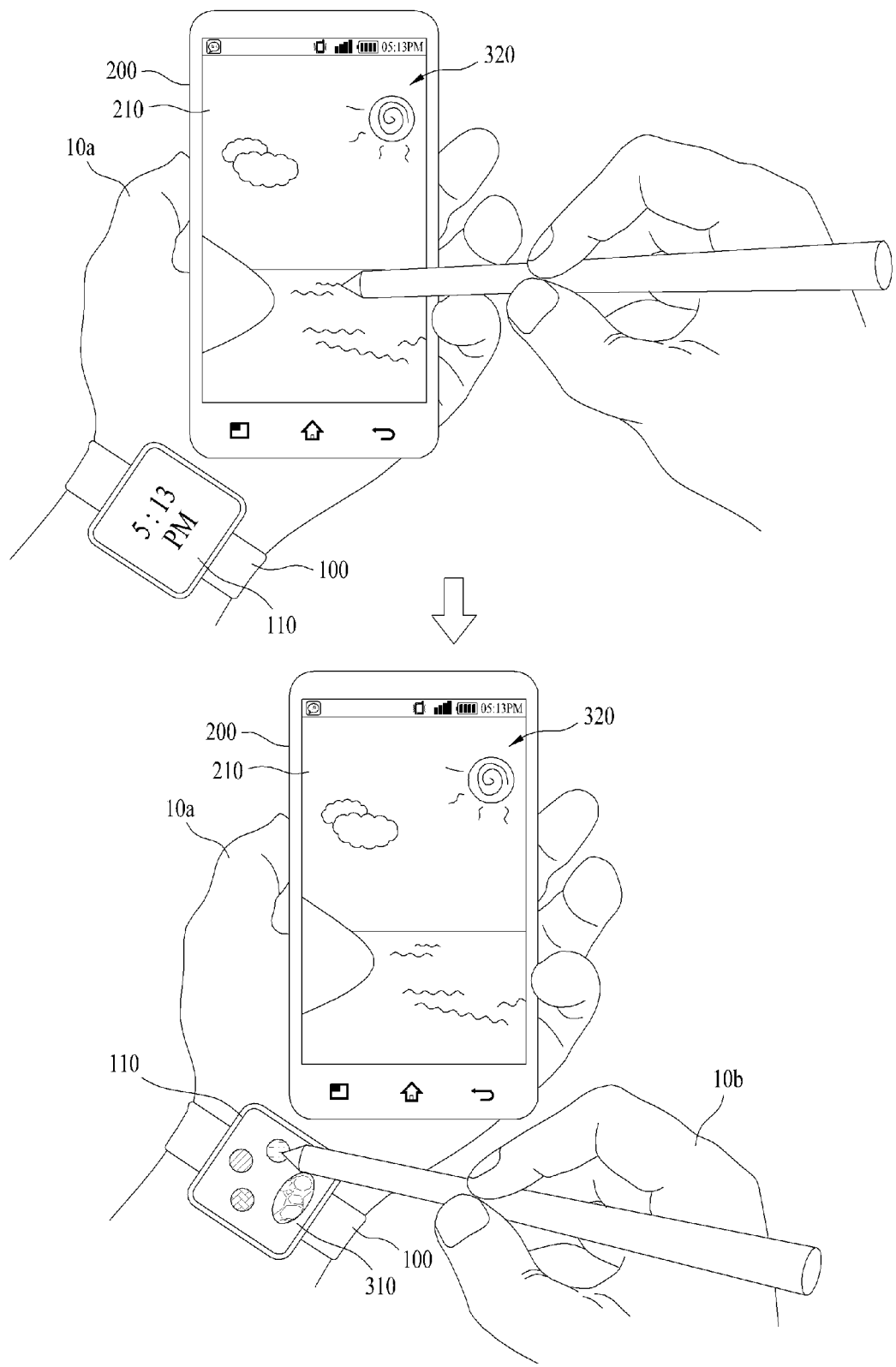
FIG. 6 is a diagram for a first embodiment of a method of controlling a smart watch and a display device according to the present specification.

FIG. 6 is a diagram for a first embodiment of a method of controlling a smart watch and a display device according to the present specification. More specifically, if the arrangement state of the smart watch 100 and the display device 200 corresponds to a first state, FIG. 6 indicates a method of using a first content 310 and a second content 320.

First of all, since the smart watch 100 and the display device 200 are in a state of being paired with each other, the smart watch 100 can detect a position state of the smart watch 100. In this case, the position state of the smart watch 100 may indicate a position, a direction, an angle, an image, and the like of the display unit 110 of the smart watch 100. As mentioned earlier in FIG. 3, the position state of the smart watch can be detected by a camera unit, a sensor unit, and the like installed in the smart watch 100. For instance, referring to FIG. 6a, the position state of the smart watch 100 corresponds to a state that the display unit 110 faces a user 10.

Subsequently, the smart watch 100 can transmit the position state of the smart watch 100 to the display device 200. And, the display device 200 can receive the position state of the smart watch 100 from the smart watch 100. In this case, the display device 200 can execute a second content 320 in the display unit 210. In this case, the second content is a content executed by a user 10 in the display unit 210 of the display device 200. The second content can be independently executed by the display device 200 or executed in a manner of being connected with the smart watch 100. For instance, the second content may correspond to a drawing content in FIG. 6. In this case, the smart watch 100 can execute a separate content different from the second content 320 executed in the display device 200 in the display unit 110. According to embodiment of FIG. 6, the smart watch 100 can display a watch content in the display unit 110 irrespective of the drawing content, which is the second content 320. Meanwhile, a step of receiving the position state from the smart watch 100 by the display device 200 and a step of executing the second content by the display device 200 may change with each other in order.

And, the display device 200 can detect a position state of the display device 200. In this case, the position state of the display device 200 may indicate a position, a direction, an angle, an image, and the like of the display unit 210 of the display device 200. As mentioned earlier in FIG. 3, the position state of the display device can be detected by a camera unit, a sensor unit, and the like installed in the display device 200. For instance, referring to FIG. 6, the position state of the display device 200 corresponds to a state that the display unit 210 faces a user 10. And, a step of executing the second content by the display device 200 and a step of detecting the position state of the display device 200 may change with each other in order.

The display device 200 can determine an arrangement state of the smart watch 100 and the display device 200 from the position state of the smart watch 100 and the position state of the display device 200. As mentioned earlier in FIG. 2, the display device 200 can determine the arrangement state based on the position state detected by the display device 200 and the position state of the smart watch 100 received from the smart watch 100 as a main device. The arrangement state of the smart watch 100 and the display device 200 may include a first and a second state. Regarding this, since the first and the second state are already explained with reference to FIG. 3 to FIG. 5, detailed explanation is omitted here. Referring to a first drawing in FIG. 6, since both the display unit 110 of the smart watch 100 and the display unit 210 of the display device 200 are in a state of facing an identical direction, the display device 200 can determine it as the first state.

In this case, the display device 200 can transmit an execution signal of a first content 310 to the smart watch 100. In one embodiment, if the display device 200 detects a first gesture input for a second content 320, the display device can transmit the execution signal of the first content to the smart watch 100. Referring to the first drawing in FIG. 6, if a stylus pen held by a hand of a user 10b touches the display unit 210, the display device 200 can transmit the execution signal of the first content 310 to the smart watch 100. In another embodiment, if the arrangement state is determined as the first state, the display device 200 can automatically transmit the execution signal of the first content 310 to the smart watch 100 irrespective of the first gesture input.

In this case, the first content 310 may correspond to a content related to a second content 320 currently executed in the display device 200. And, the first content 310 may correspond to a content dependent on the second content 320 currently executed in the display device 200. And, the first content 310 may correspond to an auxiliary content of the second content 320. For instance, referring to FIG. 6, the second content 320 corresponds to a drawing content (application). The display unit 210 of the display device 200 displays a sketch book and the first content 310 may correspond to a palette used in Paint.

Subsequently, the smart watch 100 can receive the execution signal of the first content 310 from the display device 200. And, the smart watch 100 can execute the first content 310. For instance, as depicted in a second drawing of FIG. 6, the smart watch 100 stops using a watch content previously used in the display unit 110 and can execute the first content 310 corresponding to a palette. By doing so, since a user 10 can change colors via the smart watch 100 while drawing a picture in the display device 100, the user can more easily use the content via the two devices.

Meanwhile, the smart watch 100 can detect a second gesture input of a user 10b performed on the first content 310. In this case, as mentioned earlier in FIG. 2, the second gesture input can include such various inputs as a direct touch input, a near touch input, and the like. According to embodiment of FIG. 6, the second gesture input may correspond to a direct touch input performed on the display unit 110. In this case, the smart watch 100 can transmit a control signal of a second content 320 to the display device 200 based on the detected second gesture input. And, the display device 200 receives the control signal of the second content 320 and can execute the control signal of the second content 320. For instance, if the smart watch 100 detects the second gesture input for changing colors on the first content 310, the smart watch can transmit a control signal for changing colors of the second content 320 to the display device 200. By doing so, the display device 200 can change the colors of the second content 320 displayed in the display unit 210.

Meanwhile, the smart watch 100 can transmit a dimming extension signal to the display device 200 based on the detected second gesture input. And, the display device 200 receives the dimming extension signal from the smart watch 100 and can extend dimming time of the second content 320. In particular, if an input signal exceeding a predetermined time is not detected on the display unit 210 of the display device 200, the display device 200 can deactivate the display unit based on the dimming time set to the device. Yet, if the dimming extension signal is received from the smart watch 100, the display device 200 can maintain an activated state of the display unit 210 although the dimming time of the display device has exceeded.

Meanwhile, although it is not depicted in FIG. 6, when the smart watch 100 executes the first content 310 and the display device 200 executes the second content 320, the display device 200 can detect an event occurrence. For instance, the occurred event may correspond to message reception, call reception, arriving on alarm time, or the like. In this case, the display device 200 stores the currently executed second content and may provide a notification on the occurred event to a user. For instance, the display device 200 can notify the user that a call is received in a state of having stored a picture in the middle of drawing.

In this case, the display device 200 can transmit a dimming extension signal of the first content 310 to the smart watch 100. The smart watch 100 receives the dimming extension signal of the first content 310 and can maintain an activated state of the display unit 110 although the dimming time set to the smart watch 100 has exceeded.

Figure 7:
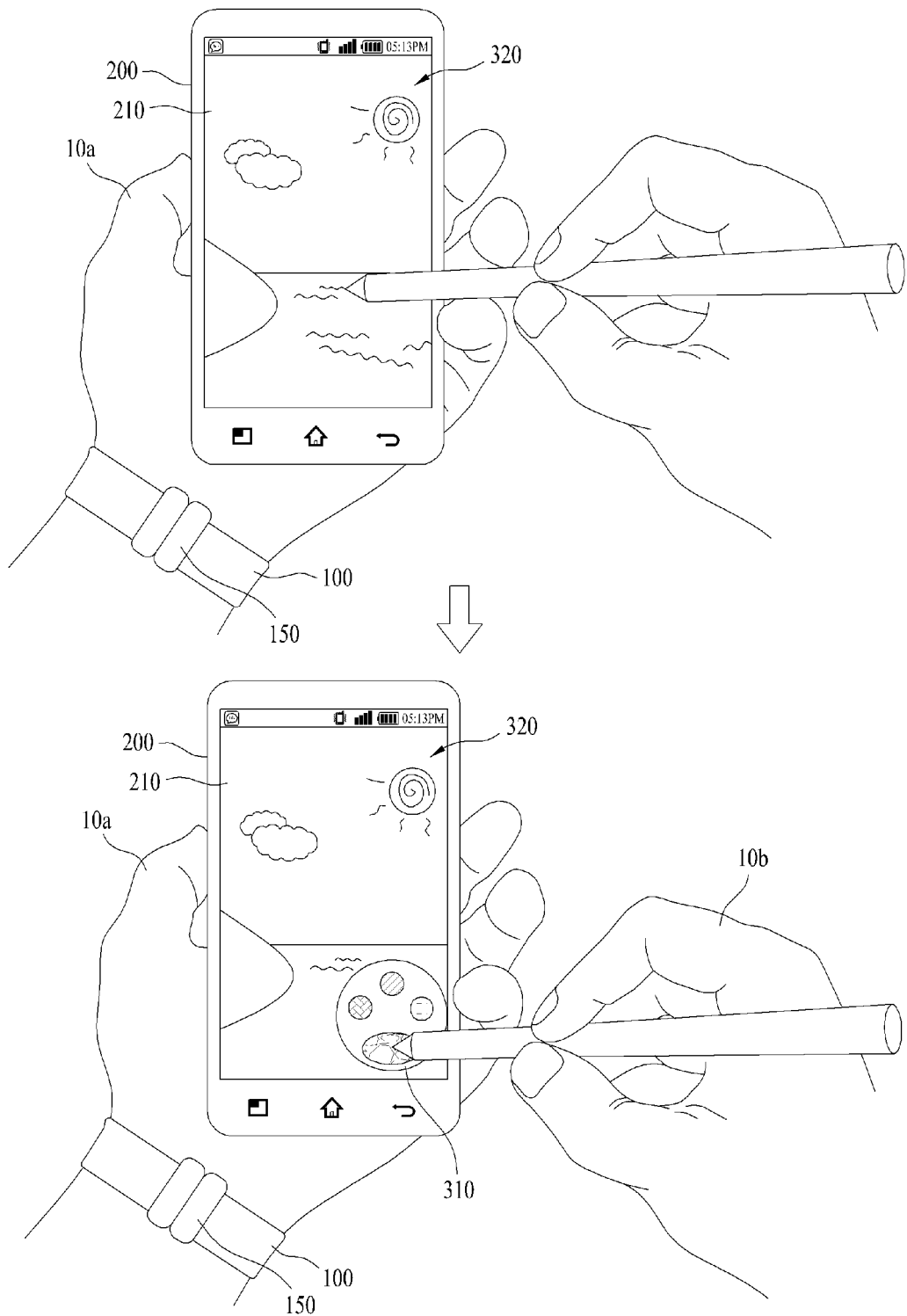
FIG. 7 is a diagram for a second embodiment of a method of controlling a smart watch and a display device according to the present specification.

FIG. 7 is a diagram for a second embodiment of a method of controlling a smart watch and a display device according to the present specification. More specifically, if an arrangement state of the smart watch 100 and the display device 200 corresponds to a second state, FIG. 7 indicates a method of using a first content 310 and a second content 320.

First of all, as mentioned earlier in FIG. 6, the smart watch 100 and the display device 200 are in a state of being paired with each other and the smart watch 100 can detect a position state of the smart watch 100. For instance, referring to FIG. 7, the position state of the smart watch 100 corresponds to a state that the display unit 110 of the smart watch faces an opposite direction of a user 10.

Subsequently, the smart watch 100 can transmit the position state of the smart watch 100 to the display device 200. And, the display device 200 can receive the position state of the smart watch 100 from the smart watch 100. In this case, the display device 200 can execute a second content 320. And, the display device 200 can detect a position state of the display device 200. For instance, referring to FIG. 7, the position state of the display device 200 correspond to a state that the display unit 210 of the display device faces the user 10.

And, the display device 200 can determine an arrangement state of the smart watch 100 and the display device 200 based on the position state of the smart watch 100 and the position state of the display device 200. According to embodiment of FIG. 7, since the display unit 110 of the smart watch 100 and the display unit 210 of the display device 200 do not face an identical direction, the display device 200 can determine it as a second state.

In this case, the display device 200 may not transmit an execution signal of a first content to the smart watch 100. This is because, since the display unit 110 of the smart watch 100 is in a state of not facing the user 10 in the embodiment of FIG. 7, it is difficult for the user 10 to use the display units of the two devices at the same time.

And, the display device 200 can execute a first content 310. For instance, referring to FIG. 7, the display device 200 can display a palette corresponding to the first content 310 in the display unit 210 of the display device 200. In particular, if an arrangement state of the smart watch 100 and the display device 200 corresponds to the second state, the display device 200 can execute the first content 310, which is relevant to the currently executed second content 320, in the display device 200. By doing so, the user 10 may use the content using the display device 200 only irrespective of the smart watch 100.

Figure 8A:
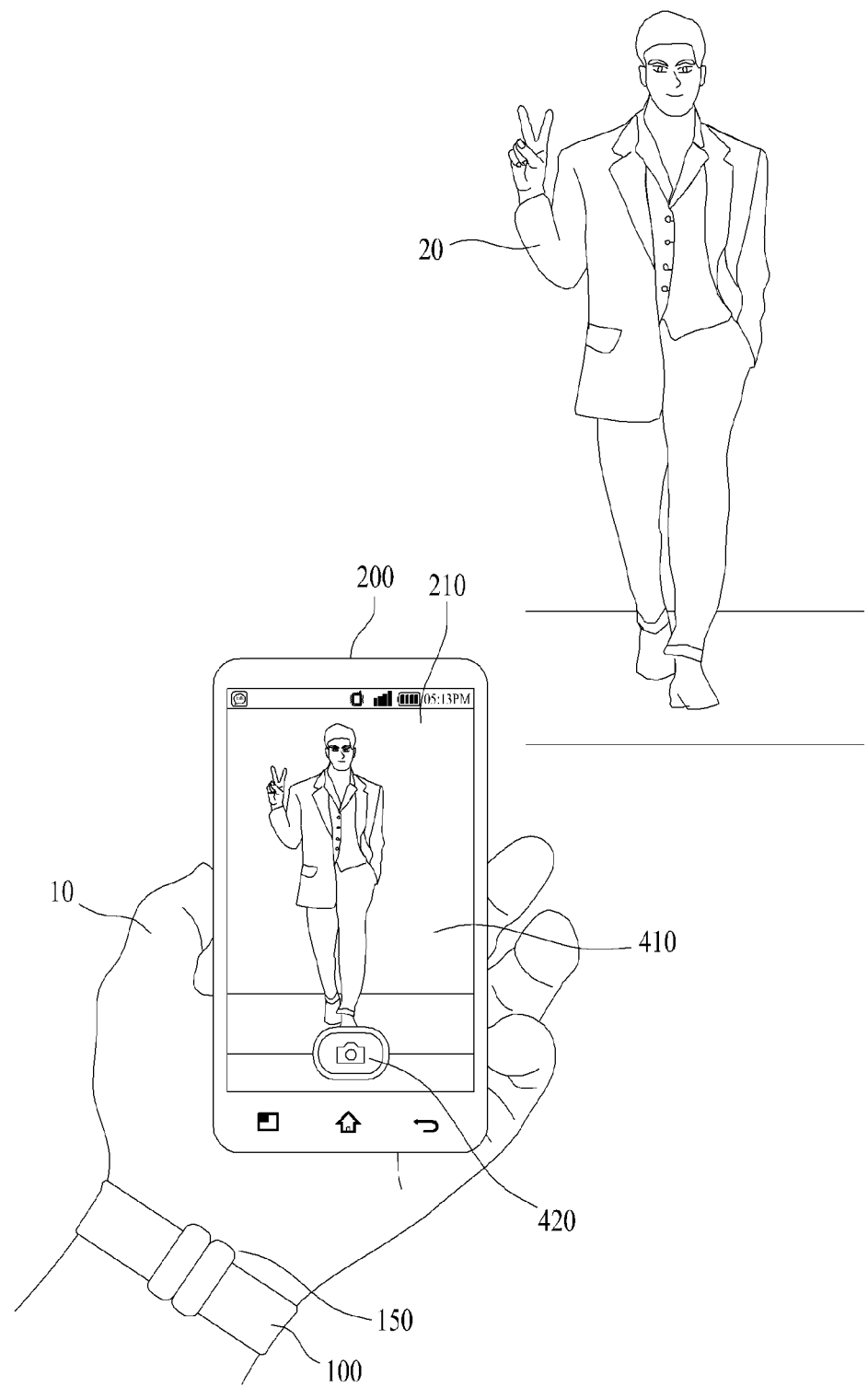

FIG. 8 is a diagram for a third embodiment of a method of controlling a smart watch and a display device according to the present specification. More specifically, FIG. 8a is a diagram for a preview interface provided to a user 10 in case of sensing an angle of view via a camera unit of the display device 200 and FIG. 8b is a diagram for a preview interface provided to a counterpart 20 via the display unit 100 of the smart watch 100.

The embodiment of FIG. 8 is an embodiment regarding a mirroring and indicates that a content displayed in the display device 200 is displayed in the smart watch 100 in a manner of copying the content as it is. FIG. 8 indicates a case that a camera preview interface is identically provided to both the display device 200 and the smart watch 100.

First of all, the smart watch 100 and the display device 200 are in a state of being paired with each other. The smart watch 100 can detect a position state of the smart watch 100. For instance, referring to FIG. 8a, the position state of the smart watch 100 corresponds to a state that the display unit 110 of the smart watch faces a counterpart 20 instead of a user 10. Subsequently, the smart watch 100 transmits the position state of the smart watch 100 to the display device 200 and the display device 200 can receive the position state of the smart watch 100. In this case, the display device 200 can execute a first camera content in the display unit 210. The first camera content may correspond to a camera application. For instance, as depicted in FIG. 8a, the first camera content may include a first image preview interface 410 and an image capturing trigger 420.

And, the display device 200 can detect a position state of the display device 200. For instance, referring to FIG. 8a, the position state of the display device 200 corresponds to a state that the display unit 210 faces the user 10. Subsequently, the display device 200 can determine an arrangement state of the smart watch 100 and the display device 200 based on the position state of the smart watch 100 and the position state of the display device 200. According to the embodiment of FIG. 8, since the display unit 110 of the smart watch 100 and the display unit 210 of the display unit 200 do not face an identical direction, the display device 200 can determine the arrangement state of the smart watch 100 and the display device 200 as a second state.

In this case, the display device can transmit an execution signal of a second camera content to the smart watch 100. In this case, the second camera content may correspond to a content relevant to the first camera content. For instance, as depicted in FIG. 8b, the second camera content may include a second image preview interface 430. And, the second image preview interface 430 can display an image displayed in the first image preview interface 410. In particular, referring to FIG. 8b, the smart watch 100 executes the second camera content and can provide an image sensed by a camera unit 250 of the display device 200 to the counterpart 20.

Meanwhile, a wrist of the user 10 capturing an image using the display device 200 may be obliquely positioned instead of being horizontally positioned. In this case, as depicted in FIG. 8b, although a gradient of an image sensed by the camera unit 250 is horizontal but the display unit 110 of the smart watch 100 may incline. Hence, the smart watch 100 can provide an image provided to the display unit 110 in a manner of horizontally compensating it based on the gradient of the smart watch 100 using such various sensors included in the sensor unit as an acceleration sensor and the like. By doing so, the counterpart 20, which becomes a model of the sensed image, can check the image of the counterpart in a horizontal state via the display unit 110 of the smart watch 100 irrespective of an angle of an arm of the user 10.

Figure 9:
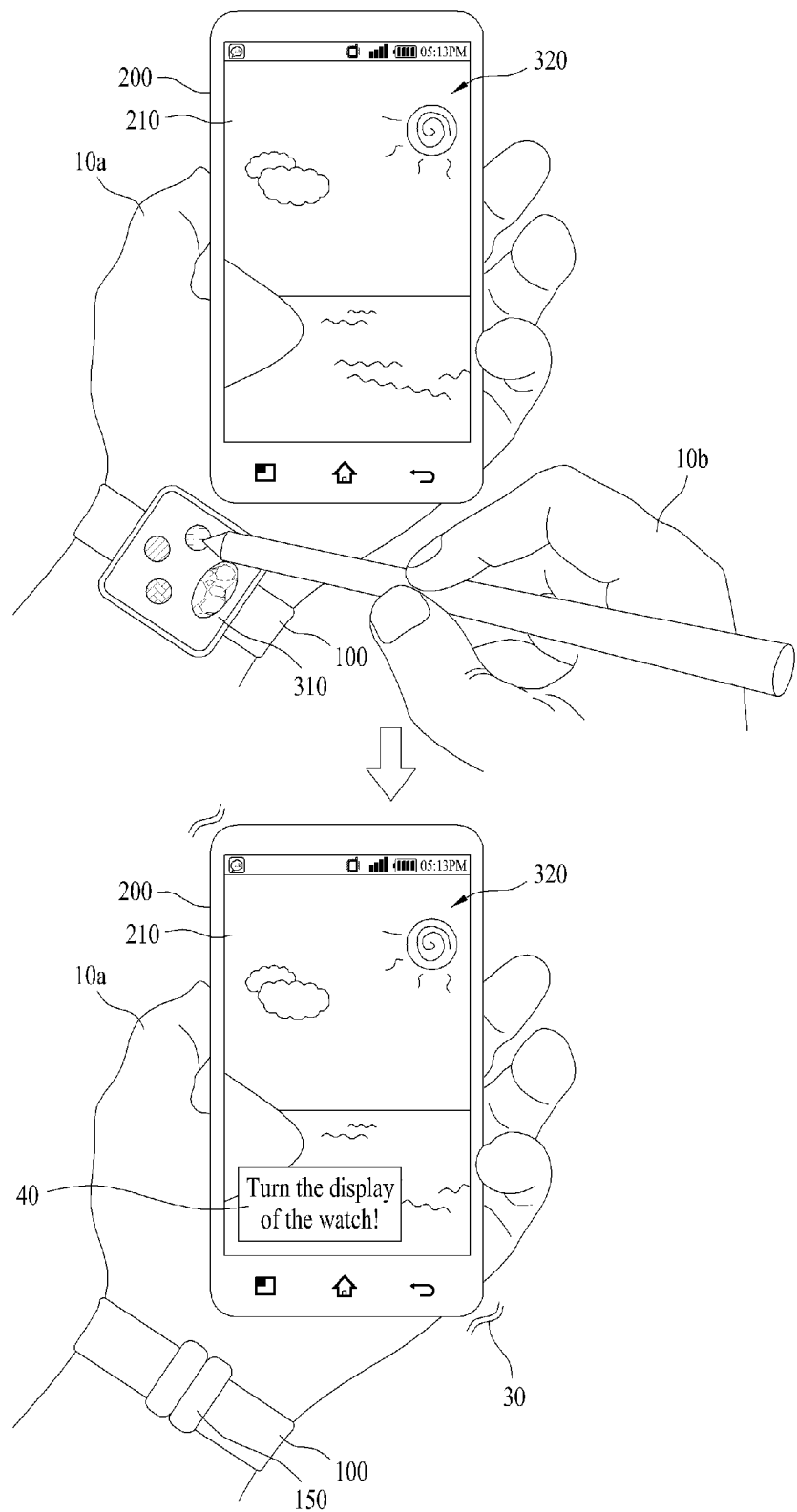
FIG. 9 is a diagram for a fourth embodiment of a method of controlling a smart watch and a display device according to the present specification.

FIG. 9 is a diagram for a fourth embodiment of a method of controlling a smart watch and a display device according to the present specification. More specifically, FIG. 9 indicates a case that an arrangement state of the smart watch 100 and the display device 200 is modified from a first state to a second state.

First of all, as depicted in a first drawing of FIG. 9, the arrangement state of the smart watch 100 and the display device 200 corresponds to the first state. Hence, a user 10 can use the smart watch 100 and the display device 200 at the same time. In this case, as depicted in a second drawing of FIG. 9, the arrangement state of the smart watch 100 and the display device 200 can be modified into the second state. In particular, according to the embodiment of FIG. 9, a state of the display unit 110 of the smart watch 100 facing the user 10 can be modified into a state of facing an opposite side of the user. By doing so, it may become a state that it is impossible to use the smart watch 100 and the display device 200 at the same time.

In one embodiment, if the arrangement state of the smart watch 100 and the display device 200 is modified from the first state to the second state, the display device 200 can display a third content in the display unit 110 of the smart watch 100 or the display unit 210 of the display device 200. In this case, the third content may correspond to a content inducing the arrangement state of the smart watch 100 and the display device 200 to be the first state. For instance, referring to a second drawing of FIG. 9, since the display device 200 still faces the user 10, the display unit 210 can display a content 40 capable of inducing the display unit 110 of the smart watch 100 to face the user 10 again in the display unit 210. In particular, as depicted in FIG. 9, the display device 200 displays a message like 'Turn the display of the smart watch!' in the display unit 210 and can induce the user 10 to turn a direction of the display unit 110 of the smart watch 100.

And, for instance, referring to the second drawing of FIG. 9, the display device 200 can induce the user 10 to make the display unit 110 of the smart watch 100 face the user 10 again in a manner of generating vibration 30. Besides, the display device 200 can induce the arrangement state of the smart watch 100 and the display device 200 to be modified into the first state via various schemes.

In another embodiment, if the arrangement state of the smart watch 100 and the display device 200 is modified from the first state to the second state, the display device 200 can terminate a content displayed in a display unit of a device where it is difficult for the user to use. For instance, as depicted in FIG. 9, if the display unit 110 of the smart watch 100 does not face the user 10, the display device 200 can transmit a first content termination signal to the smart watch 100.

Figure 10:
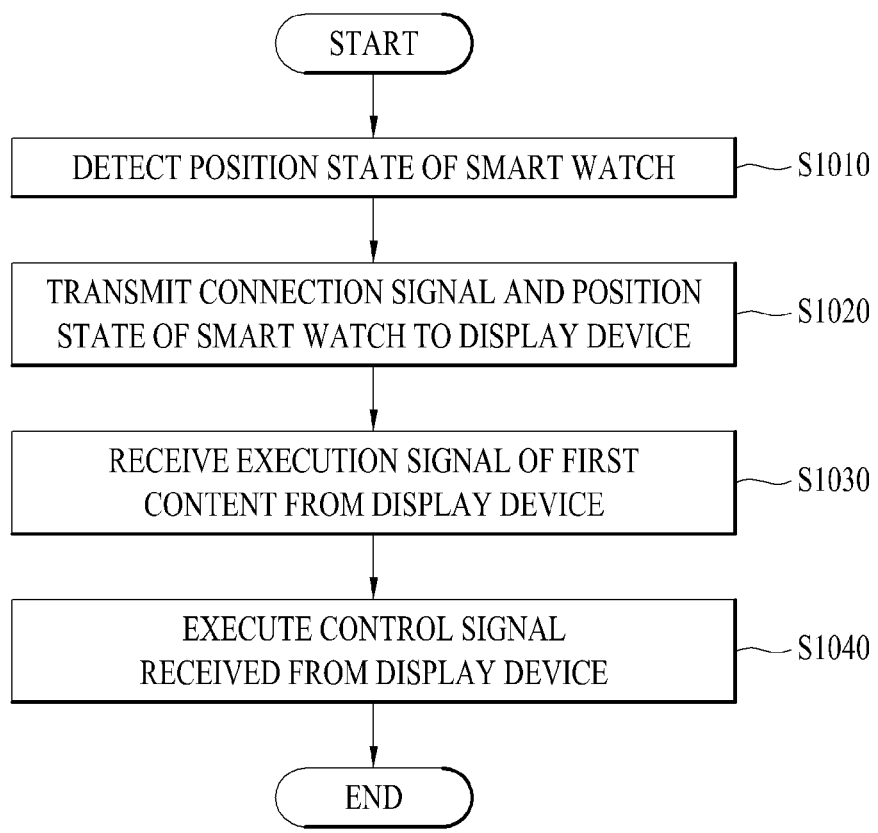
FIG. 10 is a flowchart for a method of controlling a smart watch according to the present specification.

FIG. 10 is a flowchart for a method of controlling a smart watch according to the present specification.

First of all, the smart watch can detect a position state of the smart watch [S1010]. In this case, as mentioned earlier in FIG. 6, the position state of the smart watch may include a direction, an angle, a sensed image, a position, and the like of the smart watch.

Subsequently, the smart watch can transmit a connection signal and the position state of the smart watch to the display device [S1020]. In this case, the connection signal may correspond to a signal inducing the smart watch and the display device to be paired with each other.

Subsequently, the smart watch can receive an execution signal of a first content from the display device [S1030]. More specifically, if an arrangement state of the smart watch and the display device corresponds to a first state, the smart watch can receive the execution signal of the first content from the display device. As mentioned earlier in FIG. 6, the first content may correspond to content relevant to a second content.

Subsequently, the smart watch can execute a control signal received from the display device [S1040]. In particular, the smart watch can execute the first content based on the control signal of the first content received from the display device.

Figure 11:
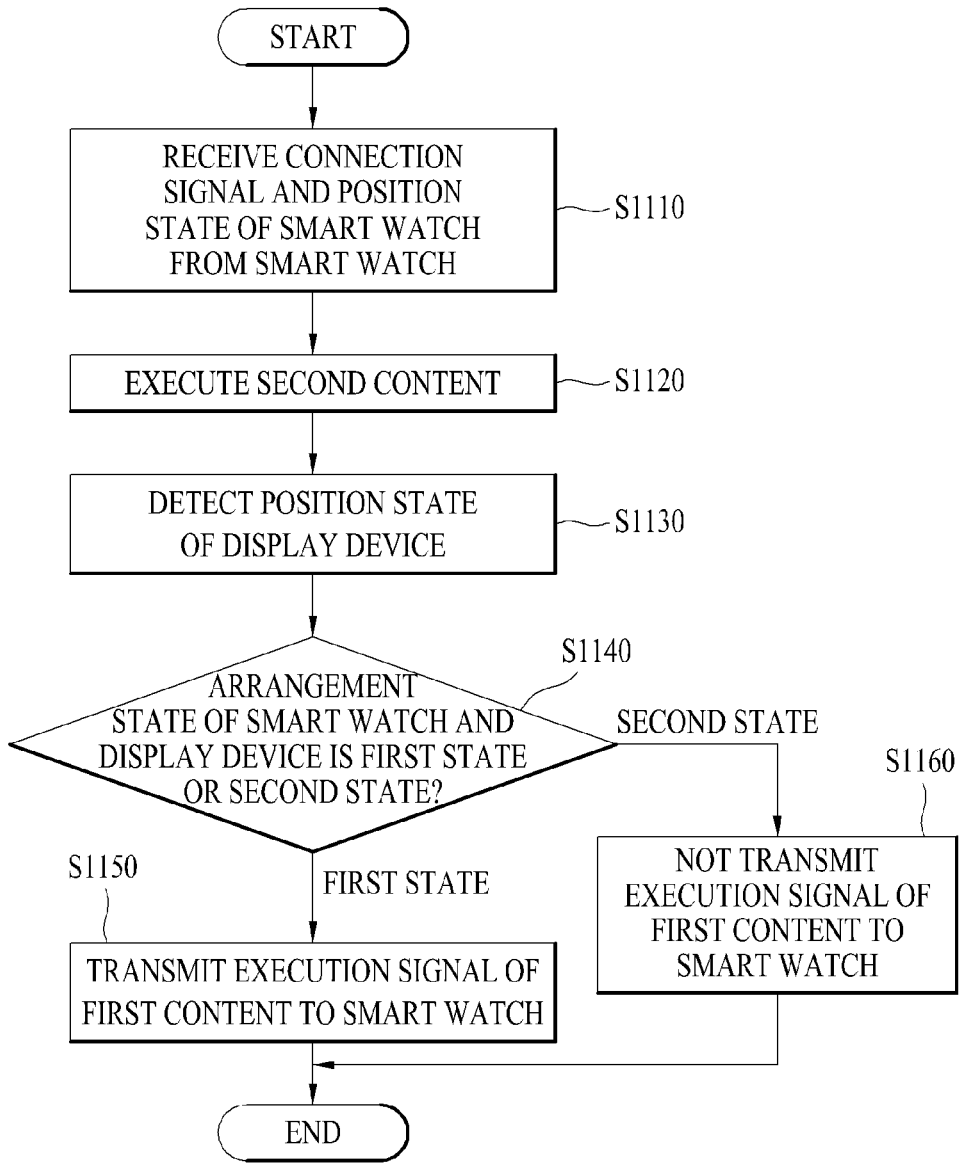
FIG. 11 is a flowchart for a method of controlling a display device according to the present specification.

FIG. 11 is a flowchart for a method of controlling a display device according to the present specification.

First of all, the display device can receive a connection signal and a position state of the smart watch from the smart watch [S1110]. The display device receives the connection signal from the smart watch and can perform a pairing between the smart watch and the display device.

Subsequently, the display device can execute a second content [S1120].

Subsequently, the display device can detect a position state of the display device [S1130]. And, as mentioned earlier in FIG. 6, the position state of the display device may include an angle, a direction, a position, a sensed image, and the like of the display device.

Subsequently, the display device can determine whether an arrangement state of the smart watch and the display device corresponds to a first state or a second state [S1140]. As mentioned earlier in FIG. 2, assume that the display device is a main device and the smart watch is a sub device. And, as mentioned earlier in FIG. 3 to FIG. 5, the first state may correspond to a state that a user can easily use the display unit of the smart watch and the display unit of the display device at the same time. And, the second state may correspond to a state that a user cannot use the display unit of the smart watch or the display unit of the display device. In this case, a sequence of the step S1120 to the step S1140 can change.

In the step S1140, if the arrangement state of the smart watch and the display device corresponds to the first state, the display device can transmit an execution signal of the first content to the smart watch [S1150]. In particular, the display device can induce the first content relevant to the second content to be executed in the display unit of the smart watch while executing the second content.

Meanwhile, in the step S1140, if the arrangement state of the smart watch and the display device corresponds to the second state, the display device may not transmit the execution signal of the first content [S1160]. And, as mentioned earlier in FIG. 7, if the arrangement state of the smart watch and the display device corresponds to the second state, the display device can display the first content in the display unit of the display device.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A smart watch and a method of controlling therefor according to the present specification may not limitedly apply to the composition and method of the aforementioned embodiments. The aforementioned embodiments may be configured in a manner of being selectively combined the whole of the embodiments or a part of the embodiments to achieve various modifications.

Meanwhile, a smart watch and a method of controlling therefor can be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, implementing in a form of a carrier wave such as a transmission via the internet and the like is also included. And, since the recording media readable by the processor are distributed to the computers connected by a network, codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on both of the inventions can be complementarily applied, if necessary.

What is claimed is:

1. A smart watch, comprising:
 a communication unit configured to transmit a connection signal and a position state of the smart watch to a display device and receive an execution signal of a first content from the display device;
 a display unit configured to display the first content;
 a sensor unit configured to detect the position state of the smart watch;
 a camera unit configured to sense an image in a front direction; and
 a processor configured to control the communication unit, the display unit, the sensor unit, and the camera unit and execute a received control signal,
 wherein the display device is configured to:
  receive the connection signal and the position state of the smart watch from the smart watch,
  execute a second content,
  detect a position state of the display device,
  when an arrangement state of the smart watch and the display device corresponds to a first state, transmit the execution signal of the first content to the smart watch, and
  when the arrangement state of the smart watch and the display device corresponds to a second state, execute the first content in the display device,
 wherein the first content corresponds to a content relevant to the second content currently executed in the display device, and
 wherein the first state corresponds to a state that the display unit of the smart watch and a display unit of the display device face an identical direction and the second state corresponds to a state that the display unit of the smart watch and the display unit of the display device do not face an identical direction.

2. The smart watch of claim 1, wherein the display device is further configured to:
 detect a first gesture input, and,
 if the arrangement state of the smart watch and the display device corresponds to the first state, transmit the execution signal of the first content to the smart watch based on the detected first gesture input.

3. The smart watch of claim 1, wherein if the arrangement state corresponds to the second state, the display device is further configured not to transmit the execution signal of the first content.

4. The smart watch of claim 3, wherein the display device is further configured to display the first content in the display unit of the display device.

5. The smart watch of claim 1, wherein the first state indicates a case that a similarity between an image sensed via the camera unit of the smart watch and an image sensed by a camera unit of the display device exceeds a predetermined ratio and the second state indicates a case that the similarity between the image sensed via the camera unit of the smart watch and the image sensed by the camera unit of the display device does not exceed the predetermined ratio.

6. The smart watch of claim 1, wherein the first content corresponds to an auxiliary content of the second content.

7. The smart watch of claim 1, wherein the display device is further configured to receive the connection signal and the position state of the smart watch from the smart watch, execute a first camera content, detect the position state of the display device, and if the arrangement state of the smart watch and the display device corresponds to the second state, transmit an execution signal of a second camera content to the smart watch.

8. The smart watch of claim 7, wherein the first camera content comprises a first image preview interface and an image capturing trigger and the second camera content comprises a second image preview interface.

9. The smart watch of claim 8, wherein the second image preview interface provides an image sensed by a camera unit of the display device in a manner of horizontally compensating the image based on a gradient of the smart watch.

10. The smart watch of claim 2, wherein the processor is further configured to:
detect a second gesture input performed on the first content, and,
transmit a control signal of the second content to the display device based on the detected second gesture input.

11. The smart watch of claim 10, wherein the processor is further configured to transmit a dimming extension signal of the second content to the display device based on the detected second gesture input.

12. The smart watch of claim 1, wherein if the arrangement state of the smart watch and the display device is modified from the first state to the second state, the display device is further configured to display a third content in the display unit of the smart watch or the display unit of the display device,
wherein the third content corresponds to a content inducing the arrangement state of the smart watch and the display device to be the first state.

13. The smart watch of claim 1, wherein if an event occurrence is detected in the first state, the display device is further configured to store the currently executed second content and provide a notification on the occurred event.

14. The smart watch of claim 13, wherein the display device is further configured to transmit a dimming extension signal of the first content to the smart watch.

15. A display device, comprising:
a communication unit configured to receive a connection signal and a position state of a smart watch from the smart watch, and transmit an execution signal of a first content if an arrangement state of the smart watch and the display device corresponds to a first state;
a display unit configured to display a second content;
a sensor unit configured to detect a position state of the display device;
a camera unit configured to sense an image in a front direction; and
a processor configured to control the communication unit, the display unit, the sensor unit, and the camera unit, execute the second content, and execute a received control signal,
wherein the processor is further configured to:
when an arrangement state of the smart watch and the display device corresponds to a second state, execute the first content to the display device,
wherein the smart watch is configured to:
transmit the connection signal and the position state of the smart watch to the display device, and
when the arrangement state of the smart watch and the display device corresponds to the first state, receive the execution signal of the first content and execute the first content in the smart watch,
wherein the first content corresponds to a content relevant to the second content currently executed in the display device, and
wherein the first state corresponds to a state that a display unit of the smart watch and the display unit of the display device face an identical direction and the second state corresponds to a state that the display unit of the smart watch and the display unit of the display device do not face an identical direction.

16. A method of controlling a smart watch, the method comprising:
detecting a position state of the smart watch;
transmitting a connection signal and a position state of the smart watch to a display device;
receiving an execution signal of a first content from the display device; and
executing a control signal received from the display device,
wherein the display device is configured to:
receive the connection signal and the position state of the smart watch from the smart watch,
execute a second content,
detect a position state of the display device,
when an arrangement state of the smart watch and the display device corresponds to a first state, transmit the execution signal of the first content to the smart watch, and
when the arrangement state of the smart watch and the display device corresponds to a second state, execute the first content in the display device,
wherein the first content corresponds to a content relevant to the second content currently executed in the display device, and
wherein the first state corresponds to a state that the display unit of the smart watch and a display unit of the display device face an identical direction and the second state corresponds to a state that the display unit of the smart watch and the display unit of the display device do not face an identical direction.

17. A method of controlling a display device, the method comprising:
receiving a connection signal and a position state of a smart watch from the smart watch;
executing a second content;
detecting a position state of the display device;
when an arrangement state of the smart watch and the display device corresponds to a first state, transmitting an execution signal of a first content to the smart watch; and
when the arrangement state of the smart watch and the display device corresponds to a second state, executing the first content in the display device,
wherein the smart watch is configured to:
transmit the connection signal and the position state of the smart watch to the display device, and
when an arrangement state of the smart watch and the display device corresponds to the first state, receive the execution signal of the first content, and execute the first content in the smart watch, wherein the first content corresponds to a content relevant to the second content currently executed in the display device, and wherein the first state corresponds to a state that a display unit of the smart watch and the display unit of the display device face an identical direction and the second state corresponds to a state that the display unit of the smart watch and the display unit of the display device do not face an identical direction.

* * * * *